United States Patent [19]

Werley et al.

[11] Patent Number: 4,457,329
[45] Date of Patent: Jul. 3, 1984

[54] SAFETY PRESSURE REGULATOR

[75] Inventors: Barry L. Werley, Allentown; Richard H. Snyder, Joseph E. McQuillen both of Macungie, Keith A. Miller, Allentown all of Pa.

[73] Assignee: Air Products and Chemicals, Inc., Allentown, Pa.

[21] Appl. No.: 327,323

[22] Filed: Dec. 4, 1981

[51] Int. Cl.³ ............................................. F16K 13/04
[52] U.S. Cl. ...................................... 137/73; 137/75; 137/505.42
[58] Field of Search ............... 137/72, 73, 75, 505.42, 137/74

[56] References Cited

U.S. PATENT DOCUMENTS

| 432,404 | 7/1890 | Grinnell | 137/72 X |
| 514,161 | 2/1894 | Newton | 137/72 X |
| 1,386,466 | 8/1921 | Gartside | 137/75 |
| 1,938,967 | 12/1933 | Lovekin | 137/75 |
| 1,944,518 | 1/1934 | Lovekin | 137/73 |
| 2,777,456 | 1/1957 | Ey | 137/73 |
| 3,638,733 | 2/1972 | DeRouville | 137/72 |
| 3,776,457 | 12/1973 | Cardi | 137/74 |
| 3,809,108 | 5/1974 | Hughes | 137/73 |
| 3,911,948 | 10/1975 | Collins | 137/73 X |
| 4,099,538 | 7/1978 | Curtis | 137/73 |
| 4,290,440 | 9/1981 | Sturgis | 137/75 |

FOREIGN PATENT DOCUMENTS 530601 9/1931 Fed. Rep. of Germany ........ 137/74

Primary Examiner—Harold W. Weakley
Attorney, Agent, or Firm—James C. Simmons; E. Eugene Innis

[57] ABSTRACT

A safety pressure regulator employing a diaphragm actuator that upon exposure to high temperature an element melts to release the valve from the actuator to effect its automatic closing.

3 Claims, 7 Drawing Figures

SAFETY PRESSURE REGULATOR

TECHNICAL FIELD

This invention relates to pressure regulators used to control the pressure of fluids usually in the gaseous form.

BACKGROUND OF THE PRIOR ART

Pressure reducing regulators consisting of controllable valve arrangements capable of providing a constant outlet pressure over a wide range of variable source pressures are well known and available commercially. A controllable diaphragm arrangement, or a piston device, in communication with the outlet pressure generally is used to adjust the valve opening in response to outlet pressure variations. The diaphragm operates in response to two forces, one, a controllable reference force produced by biasing means such as a range spring having adjustable compression or by an adjustable quantity of trapped gas or a combination thereof, and two, the force on the diaphram surface from the outlet pressure of the fluid downstream from the valve arrangement. The diaphragm operates to adjust the valve opening such that these two forces are equal and stable. If fluid is rapidly withdrawn from the outlet side of the valve arrangement, the outlet pressure will drop, and the range spring force will shift the diaphragm to open the valve further and maintain constant outlet pressure. If the outlet pressure increases, e.g., because the regulator valve opens too far or because fluid flow from the downstream side of the valve arrangement ceases or diminishes, the force of the outlet pressure on the diaphragm will shift the valve toward a closed position and prevent upstream source pressure from increasing the outlet pressure above that constant level which balances the assigned reference force.

However, in the event of fire or intense heat within the regulator or other system component such as a relief valve or downstream tubing, the diaphragm is frequently breached, with the resultant undesirable effect of an elimination of the outlet pressure force on the diaphragm and an escape of the flowing gas past the diaphragm through the spring cage and breaking the integrity of the housing. The range spring force then shifts the valve to an open position, thereby supplying a greatly increased flow of fluid to the fire. Such a condition becomes extremely critical when the controlled fluid is an oxidant, in which case increased fluid flow accelerates the fire.

Paine, U.S. Pat. No. 1,140,313, shows an automatic safety device having a fusible element external to the valve arrangement for cutting off the flow of combustible fluids. A diaphragm takes the place of packing to prevent leakage around the valve stem.

Lovekin, U.S. Pat. No. 1,248,143, discloses a valve arrangement wherein a first fluid, such as a fuel stream to a domestic hot water heater, is closed by a valve upon the melting of a fusible element in a second fluid line, such as the hot water pipe. A diaphragm is used in the hot water pipe to provide a leakage prevention device which is extendable with the valve stem.

McKhann, U.S. Pat. No. 3,608,570, shows yet another valve system, which like the aforementioned patents is incapable of acting as a pressure regulator, in which the valve is moved to a closed position by an external fusible material in response to a high temperature condition.

Guimbellot, U.S. Pat. No. 3,730,205, shows a simple valve system, not a pressure regulator, having a fusible plug which softens at elevated temperatures or upon prolonged contact with crude oil. The softened plug is capable of closing an otherwise constantly open valve.

Collins, Jr. et al, U.S. Pat. No. 3,911,948, which patent is owned by the assignee of the present invention, shows a pressure regulator for delivering an oxidant gas from a high pressure source to a lower adjustably controllable and constant pressure. Critical problems associated with oxidant fluids in a pressure regulator are minimized by substituting proper materials of construction for combustible materials normally used for valve seating.

In many cases, the heat and temperature of the fluid inside a piping system may be higher or more critical than the external temperature of the surrounding area, e.g., with steam in high temperature, high pressure pipes or with oxidant fluids such as in oxygen delivery. In the event of fire or extremely hazardous high temperatures interior to a pressure regulator having a diaphragm controlling mechanism to provide a constant outlet pressure, the diaphragm is frequently breached, whereupon the regulator fails in the open position. For these and other applications, a pressure regulator for delivering a constant outlet pressure and having an automatic safety shutoff responsive to internal high temperatures or fire would be highly desirable for safety reasons.

BRIEF SUMMARY OF THE INVENTION

The improved pressure regulator of our invention having an automatic safety shutoff protective device has a valve movement control system comprising an improved valve stem assembly connecting the valve to a controllable flexible diaphragm such that diaphragm movement in response to a change in outlet pressure acts through the valve stem to move the valve, wherein at least a portion of the valve stem assembly comprises a heat sensitive element which is fusible, flammable, or reactable in response to a predetermined internal heat level at which the element activates, i.e., fuses, burns, or otherwise reacts to remove any force acting on the valve by the valve stem. Biasing means constantly urging the valve to a closed position are activated when the heat sensitive element fuses, burns, or reacts, whereupon the valve automatically closes. In all cases, the heat sensitive element resides within the pressure regulator casing and is responsive to internal fluid heat energy.

The pressure regulator of our invention is particularly adaptable to the pressure regulation of oxidant fluids and, in that application, provides additional safety in the event of internal fire by stopping the flow of oxidant fluid through the regulator. The heat sensitive element can be viewed as an integral component for which the sensing and control actions are one and the same. In one embodiment, the heat sensitive element may participate and be consumed in the fire by reacting with the oxidant fluid thereby reducing the time of response to the predetermined temperature or heat level event.

Therefore, it is an object of the present invention to provide an improved pressure regulator having an automatic safety shutoff responsive to a predetermined internal heat or temperature level.

It is another object of the invention to provide a device for retarding the flow of oxidant fluid in a pressure regulator which has failed from internal fire.

It is yet another object of this invention to provide means for the regulation of pressure of flowing fluid and an automatic high temperature safety shutoff in one apparatus having a minimum of components.

Specific and particular embodiments of our invention are illustrated hereinafter.

DETAILED DESCRIPTION OF THE PREFERRED EMBODIMENTS

The pressure regulator of our invention has an automatic safety shutoff responsive to a predetermined internal heat level and comprises;

a casing having an inlet and an outlet to a hollow interior and an internal port between the inlet and outlet, thereby forming an inlet chamber and an outlet chamber;

a valve in the internal port which is variably movable from a closed to an open position;

biasing means for constantly urging the valve into the closed position;

a flexible diaphragm, or alternatively a piston device, mounted in the casing and responsive to the pressure in the outlet chamber;

a valve stem connecting the valve to the diaphragm, such that the diaphragm can exert an opening force on the valve to move it to an open position variably;

a heat sensitive element internal in the casing and acting as a portion of the valve stem connection between the valve and diaphragm, wherein the element will activate, i.e. fuse, burn, or otherwise react in response to a predetermined temperature and heat level in the casing, and wherein the element activation operates to unload any opening force on the valve; and flexible biasing means for controllably urging the diaphragm against the valve stem to provide an adjustable opening force on the valve.

A fluid pressure regulator constructed in the manner of our invention provides a controlled delivery of fluid at a pressure lower than a fluid source and at a safe and convenient temperature. An application for which our safety regulator is particularly suitable is in the regulation of oxidant fluids, partiuclarly oxygen. For example, oxygen is normally stored at pressures in excess of 500 psi and typically at pressures up to 3000 psi in recpetacles such as individual cylinders or large storage tanks. However, oxygen is used at a pressure substantially below the storage pressure, e.g., at a pressure at usually less than 150 psi, such as in welding applications in delivery by hose to a welding torch, or in the medical field where oxygen is delivered to a mask or other breathing device for use by a patient. The pressure regulator of our invention functions safely to reduce the high storage pressure of the oxygen gas and deliver it to the lower pressure for usage and does so in one apparatus for convenient installation.

The use of oxygen involves an inherent danger due to its propensity to support ignition and combustion. In this regard, the elevation of temperature of the fluid itself is particularly critical and must be monitored with a degree of sensitivity which is more precise than that possible by monitoring the temperature external to the valve. The heat sensitive element of our invention therefore necessarily must be contained internal to the valve casing, or body, as shown by body 12 in FIG. 1, and must be sensitive to an elevated temperature or fire within the fluid flow.

Figure 1:
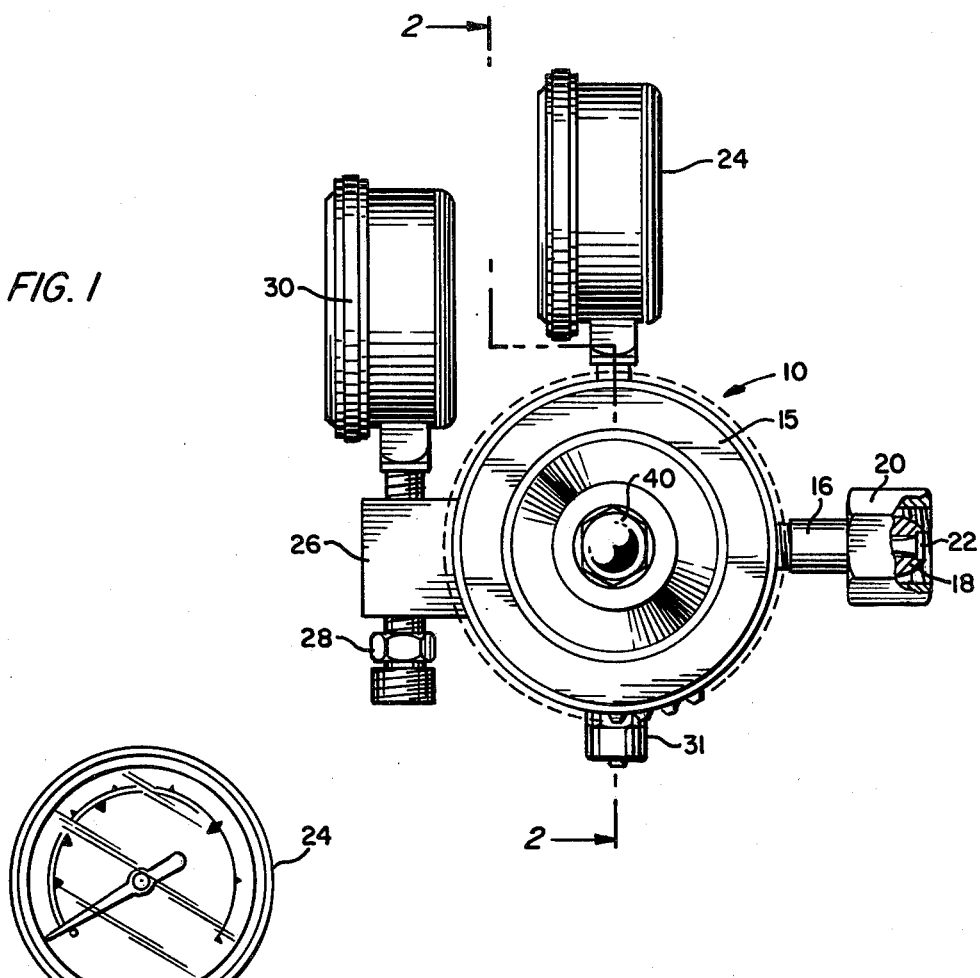
FIG. 1 is a front elevational view of a pressure regulator according to the present invention.
Figure 2:
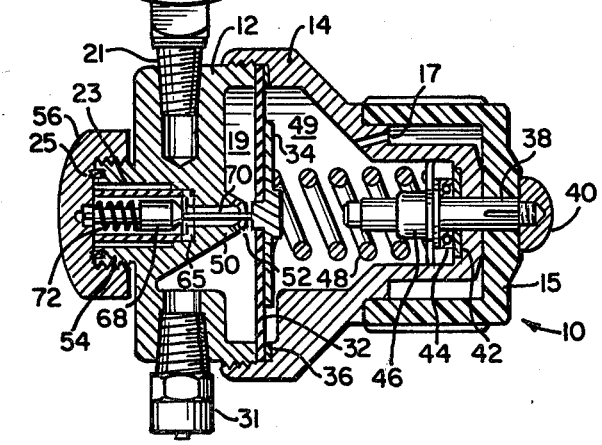
FIG. 2 is a sectional view of the section taken along the line 2—2 of FIG. 1.

FIGS. 1 and 2 show a front and sectional view, respectively, of pressure regulator 10 having body 12 (FIG. 2) threadably connected to bonnet 14 (FIG. 2). Inlet 16 having a suitable nut or fastener 20 for connecting inlet 16 to a source of high pressure gas, e.g., a cylinder, has rounded nose 18 to mate with the corresponding fitting on the source of fluid and further includes filter element 22 to filter contaminant particles from the fluid. Outlet 26 contains a fitting 28 for receiving a hose or other delivery device. The regulator shown includes safety release valve 31, control knob 15, high pressure gauge 24, and low pressure gauge 30.

Referring to FIG. 2, valve body 12 and bonnet 14 are separated by a resilient diaphragm 32 flexibly mounted to body 12, which diaphragm is usually constructed from neoprene rubber. Alternatively, a piston device may be used in place of diaphragm 32. One face of the diaphragm has an annular ring 36 of a metal such as brass to provide strength at the peripheral sealing edge and a backing plate 34 to provide a bearing surface for control spring 48. Other biasing means may be used for applying a force for a pressure against diaphragm 32 from chamber 49, e.g., a controllable pressure from a gas or a fluid source. Projecting through the end of bonnet 14 and rotatably mounted therein is a spindle 38. In communication with spindle 38 is bearing 44, bearing plate 42, and follower nut 46 to control compression and relaxation of control spring 48. The projecting end of spindle 38 has knob 15 affixed thereto by means of end nut 40. As knob 15 is rotated, the spring can be compressed to urge the diaphragm to the left as shown in FIG. 2. As the cap is rotated in the opposite direction, compression from the spring is decreased and the diaphragm 32 returns to its normal position such as shown in FIG. 2. Bonnet 14 contains suitable vent holes 17 so that the chamber defined by the bonnet 14 and diaphragm 42 is maintained at ambient pressure. In some cases, the absence of vent holes is desirable to contain a potential fire. Vent holes are not used in gas loaded regulators, i.e., regulators having an adjustable quantity of trapped gas to serve as biasing means on the diaphragm.

Body 12 of regulator 10 and diaphragm 32 define an outlet chamber 19. As shown in FIG. 2, communicating with outlet chamber 19 is a pressure relief valve 31.

Body 12 has a suitable fitting 21 for receiving low pressure gauge 24 as shown and, on the opposite end from the diaphragm 32, a projection 54 for receiving end cap 56.

Figure 3:
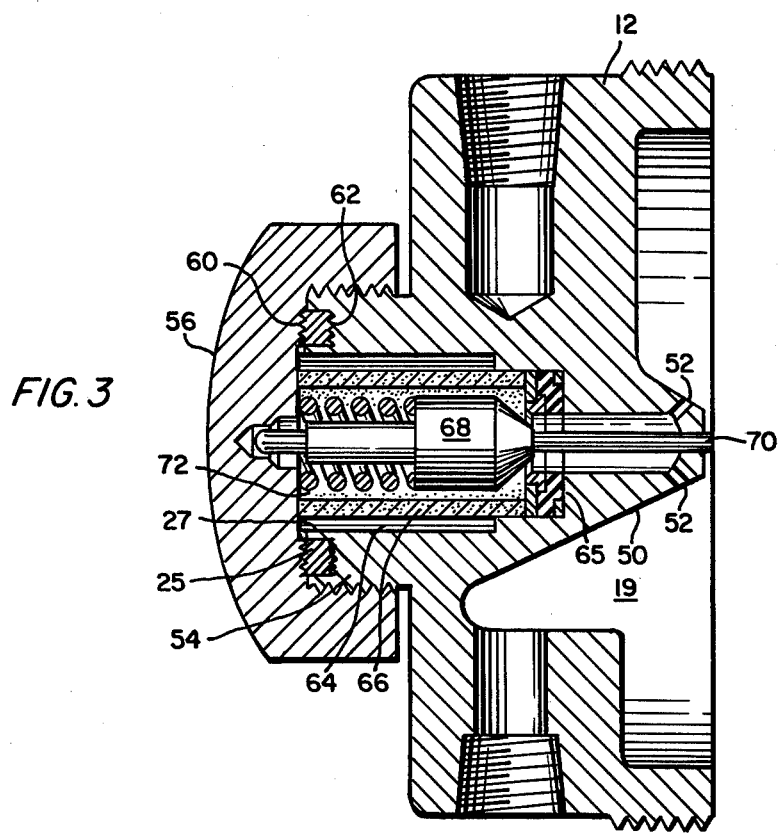
FIG. 3 is an enlarged sectional view of the regulator body with pressure gauge and relief valve removed.

As shown in FIG. 3, outlet or low pressure fluid enters chamber 19 through port 52 in projection 50 which defines the forward end of and encloses the inlet chamber 64 of the regulator. Inlet or high pressure fluid is introduced into the inlet chamber 64, which is defined by body 12, projection 50, projection 54, and cap 56, through a conduit (not shown) as is well known in the art. The entering fluid passes through porous filter 66 into the area surrounding the valve 68, past the valve 68 through valve seat 65, past valve stem 70, out port 52 into the outlet chamber 19. The opening between valve 68 and valve seat 65 controls the delivery pressure of the fluid.

As shown in FIG. 3, the valve 68 is constantly urged toward the valve seat by a spring 72. The valve is considered to be in a closed position when valve 68 is in direct contact with valve seat 65 such that no fluid may pass. The valve is opened by pushing the valve 68 toward the left (toward end cap 56 as shown) by means of a force on valve stem 70, which projects through the body 12 and bears on the diaphragm 32 by connection with backing plate 34. Spring 72 must be composed of a heat resistant material, such as an iron chromium nickel alloy, in order constantly to urge valve 68 toward valve seat 65 even in the presence of high heat conditions within the regulator.

Valve 68 is connected to valve stem 70 which in turn is connected to the diaphragm assembly comprising diaphragm 32 and backing plate 34. As will be illustrated in more detail hereinafter, at least one of the valve stem connections, e.g., the valve stem connection with valve 68 or with the diaphragm assembly, or the valve stem itself, or a portion thereof, contains a heat sensitive element which in response to a predetermined temperature is capable of uploading any force exerted through valve stem 70 on valve 68.

Thus, as the diaphragm 32 moves toward the left as shown in FIG. 2, valve 68 is pushed to the left into an open position variable by the amount of force exerted on valve 68 and spring 72 or other constant biasing means. With valve 68 in an open position, high pressure fluid passes into outlet chamber 19.

As shown in FIG. 3, the cap 56 is sealed to body 12 by means of complementary grooves or ridges 60 and 62 between which is placed a sealing member 25. Projection 54 of body 12 has suitable threading connections for facilitating removal of the cap to service the regulator. Element 25 is preferably of a fluorocarbon plastic material sold under the name KEL-F.

Cap 56 forces porous filter 66 against the valve seat 65, thus providing a seal between the filter and the valve seat so that all entering fluid comes through the filter. Also, filter 66 presses seat assembly 65 into the bottom of the counter bore (chamber 64) in body 12 sealing seat assembly 65 against body 12, thus preventing gas from leaking around 65 into outlet chamber 19.

Figure 4:
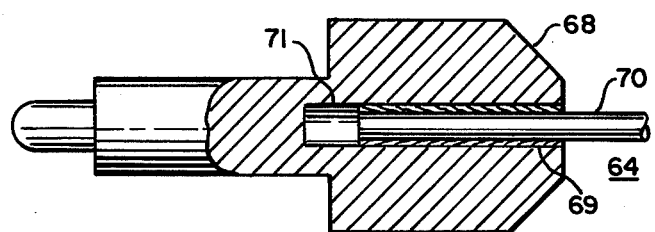
FIGS. 4 and 5 are enlarged sectional views of the valve and valve stem assembly.

Referring to FIG. 4, valve 68 (having receptacle bore 71 for receiving valve stem 70) is connected to valve stem 70 by a solder or weld compound 69, which can be a solder, glue, or adhesive and which acts as a heat sensitive fusible element such that it melts when the temperature of the fluid in outlet chamber 64 surrounding valve 68 reaches a predetermined temperature.

Figure 5:
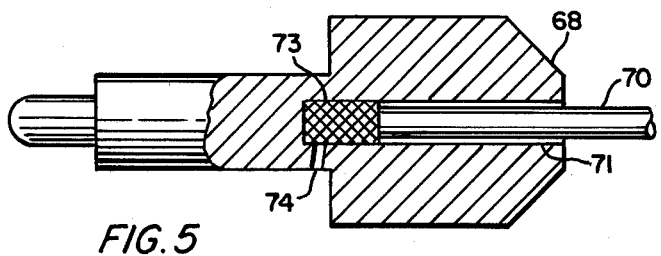

Referring to FIG. 5, valve 68 having receptacle bore 71 for receiving valve stem 70 contains a filler metal element 73 which acts as a heat sensitive fusible element when it melts at a predetermined temperature.

FIGS. 4 and 5 are illustrations of the heat sensitive element of the present invention residing in the valve-stem connection. When the temperature internal to body 12 reaches a predetermined level, the heat sensitive element fuses or melts and the valve moves into the closed position with the valve seat in response to spring 72. In FIG. 5, drain bore 74 allows the molten metal to be released when the valve moves forward onto valve stem 70.

Valve stem 70 can itself serve as the heat sensitive element required in the valve stem assembly of our invention. Different materials of construction may be selected to provide different temperatures at which the safety shutoff will be activated. Examples include carbon steel aluminum, magnesium, titanium, thermoplastic, thermosetting plastic, fiber reinforced platic, graphite/plastic composite, Woods metal, or low melting or fusible alloys of bismuth, lead, tin, cadmium, indium or other metals. The valve stem can be made to have a rough surface area having burrs or sharp edges to increase its sensitivity to the internal temperature of the regulator. Additional embodiments of a valve stem heat sensitive element include shearing the valve stem and resoldering it together with a temperature sensitive solder or connecting two pins with a splice section of a temperature sensitive material.

Figure 6:
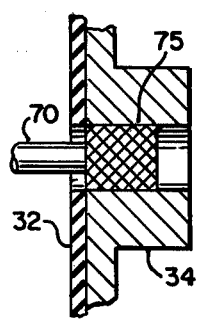
FIG. 6 is an enlarged sectional view of the valve stem and diaphragm assembly.

Referring to FIG. 6, valve stem 70 is connected to diaphragm 32 through heat sensitive insert 75, which optionally can be elevated in the direction of valve stem 70.

Heat sensitive elements taking the form of the valve stem itself or of an elevated diaphragm insert are preferred for the reason that such a heat sensitive element is in direct contact with the fluid in the regulator and thereby is immediately responsive to an increase in the fluid temperature.

The placement of the heat sensitive element on the regulated fluid side of the diaphragm may provide a safety shutoff before the diaphragm is penetrated. In an alternative embodiment, the heat sensitive element is placed on the control side of the diaphragm, thereby avoiding contact between the fluid and the heat sensitive element material.

When placed on the control side of the diaphragm, the heat sensitive element, although still itnernal to the regulator casing, is more remote from the controlled fluid. In that case, the heat sensitive element may be of a highly flammable material to speed response time.

Figure 7:
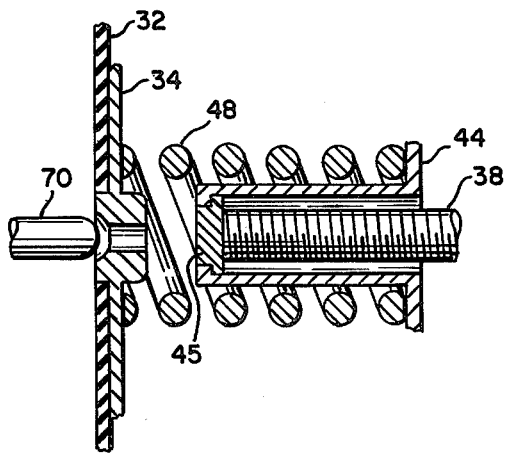
FIG. 7 is an enlarged sectional view of the valve stem, diaphragm, and control spring case assembly.

Referring to FIG. 7, a flexible biasing means for controllably urging diaphragm backing plate 34 against valve stem 70 is illustrated having control spring 48 in control spring case 44. Adjusting screw 38 provides a control mechanism adjustably to urge control spring case 44 into control spring 48, such that the spring in compression exerts a force on the diaphragm backing plate 34. Turning adjusting screw 38 in the opposite direction relieves the compression on control spring 48 and, in turn, relieves the force applied against diaphragm 32 through backing plate 34. Control spring case 44 has fusible element 45 capable of melting or igniting at a predetermined temperature. Heat sensitive element 45 fuses or ignites in response to internal heat released within the pressure regulator, thereby unloading the force applied from adjusting screw 38 to control spring case 34 and relieving the force of control spring 48 against diaphragm backing plate 34.

The valve stem optionally can have an extension through the diaphragm to the flexible biasing means, and in that case, the heat sensitive element may comprise a portion of the valve stem extension.

What is claimed is:

1. In an apparatus for maintaining constant lower pressure of a gas delivered from a relatively high pressure source of the type including a casing having an internal flexible diaphragm dividing said casing into two major chambers, one chamber being vented to the atmosphere and containing adjustable resilient means for exerting a predetermined constant pressure against the diaphragm, and the other chamber being a gas chamber divided into two sub-chambers, a first inlet sub-chamber for receiving said high pressure gas and a second outlet sub-chamber for accumulating and delivering said gas at a lower pressure to outlet means with valve-controlled means connectable between said first and second sub-chambers to regulate the pressure of said gas in said outlet sub-chamber; a removable valve seat insert ring of an elastomeric material or metal covered elastomeric material whose central opening provides the inlet to the lower pressure gas chamber, a spring-loaded valve assembly co-axial with said insert ring and including a conical valve member movable along the common axis and being constantly urged by its valve spring toward seating engagement about the inner perimeter of said insert ring opening; and means associated with the forward end of said conical valve member and with the central portion of said diaphragm to effect movement of said valve member in accordance with the movement of said diaphragm resulting from an imbalance between the force exerted upon said diaphragm by said resilient means within the vented chamber and the force exerted oppositely thereon by the gas pressure within said gas chamber, the improvement which comprises:

said means associated with the forward end of said conical valve member being an elongated, generally cylindrical pin, said pin extending from within, but not the entire length of a counter-bored hole in said conical valve member to said diaphragm, said pin fastened to and positioned by said valve member by means of a fusible material whereby when heated of a predetermined level is generated inside said apparatus, said fusible material permits said pin to retract inside said counterbore, thus permitting said conical valve member to close said inlet to said lower pressure gas chamber.

2. An apparatus according to claim 1 wherein said fusible material is the bonding agent positioning said pin in said counterbore.

3. An apparatus according to claim 1 wherein said fusible material in a plug between said pin and the bottom of said counterbore and said counterbore includes a vent aperture to permit removal of said fusible material when fusion occurs.

* * * * *